(12) United States Patent
Griffith et al.

(10) Patent No.: US 8,699,113 B2
(45) Date of Patent: Apr. 15, 2014

(54) DEFORMABLE MIRROR SUSPENSION

(75) Inventors: Michael Stewart Griffith, Chelmsford (GB); Leslie Charles Laycock, Chelmsford (GB); Nicholas John Archer, Chelmsford (GB)

(73) Assignee: BAE SYSTEMS plc (GB)

( * ) Notice: Subject to any disclaimer, the term of this patent is extended or adjusted under 35 U.S.C. 154(b) by 171 days.

(21) Appl. No.: 13/129,563

(22) PCT Filed: Nov. 17, 2009

(86) PCT No.: PCT/GB2009/051550
§ 371 (c)(1),
(2), (4) Date: May 16, 2011

(87) PCT Pub. No.: WO2010/058204
PCT Pub. Date: May 27, 2010

(65) Prior Publication Data
US 2011/0222177 A1  Sep. 15, 2011

(30) Foreign Application Priority Data

Nov. 20, 2008 (EP) ..................................... 08275078
Nov. 20, 2008 (GB) .................................. 0821210.2

(51) Int. Cl.
*G02B 26/08* (2006.01)
*G02B 7/182* (2006.01)

(52) U.S. Cl.
USPC ....................................... 359/224.1; 359/872

(58) Field of Classification Search
None
See application file for complete search history.

(56) References Cited

U.S. PATENT DOCUMENTS

| | | | |
|---|---|---|---|
| 6,384,952 B1 | 5/2002 | Clark et al. | |
| 6,838,738 B1 | 1/2005 | Costello et al. | |
| 7,068,415 B2 | 6/2006 | Mushika | |
| 2003/0053186 A1* | 3/2003 | Arima | 359/224 |
| 2004/0160118 A1 | 8/2004 | Knollenenberg et al. | |
| 2004/0245888 A1 | 12/2004 | Aksyuk et al. | |
| 2005/0052761 A1 | 3/2005 | Bennett et al. | |
| 2005/0200938 A1 | 9/2005 | Greywall | |
| 2007/0165297 A1 | 7/2007 | Sander et al. | |

FOREIGN PATENT DOCUMENTS

| | | |
|---|---|---|
| EP | 0615147 A1 | 9/1994 |
| EP | 1014139 A | 6/2000 |
| EP | 1676163 A | 7/2006 |
| JP | 03296008 A | 4/1990 |
| WO | 2004057407 A | 7/2004 |
| WO | 2004057408 A | 7/2004 |

OTHER PUBLICATIONS

International Preliminary Report on Patentability in related application No. PCT/GB2009/051550 mailed Jun. 3, 2011.
European Search Report in related application 08275078.7 dated Apr. 27, 2009.
International Search Report in related application No. PCT/GB2009/051550 mailed Dec. 23, 2009.

(Continued)

*Primary Examiner* — Jade R Chwasz
(74) *Attorney, Agent, or Firm* — Finch & Maloney PLLC

(57) ABSTRACT

A passive suspension for a bimorph or other self-deforming mirror includes elements, e.g., of herringbone shape, extending between an edge of the mirror substrate and a support structure. The elements have portions directed transversely (e.g. obliquely) relative to a direction of relative movement between the mirror edge and the support structure, so as to accommodate the movement by bending.

20 Claims, 6 Drawing Sheets

(56) References Cited

OTHER PUBLICATIONS

British Search Report in related application No. 0821210.2 mailed Mar. 2, 2009.

Faculty of Physical Sciences: Department of Physics; Research: Photonics, Imperial College London, 2007.

* cited by examiner

DEFORMABLE MIRROR SUSPENSION

CROSS REFERENCE TO RELATED APPLICATIONS

This is the U.S. National Phase of PCT/GB2009/051550, filed Nov. 17, 2009, which claims priority to British Patent Application No. 0821210.2, filed Nov. 20, 2008 and European Patent Application No. 08275078.7 filed Nov. 20, 2008 each of which are incorporated by reference herein in their entireties.

This invention relates to a suspension for a deformable mirror, and to a deformable mirror assembly including such suspension. In particular it concerns suspensions for bimorph mirrors.

Deformable mirrors are often used in the field of adaptive optics. For example, phase distortions in a signal may be sensed by a wavefront sensor and these distortions may be corrected by using a deformable mirror linked to an appropriate control system. Such deformable mirrors may be employed in numerous fields, including:

- imaging, for example deformable mirrors are used in astronomy to improve the resolution of earth-based telescopes that are otherwise affected by atmospheric distortions;
- laser sensing, where the amount of last light that can be delivered onto a target is significantly increased by using a deformable mirror to correct for atmospheric distortions—this enables either better information to be obtained or objects to be identified at a greater range; and
- laser generation, where a deformable mirror can be used intra-cavity within a high power laser to counter the thermal blooming that can be otherwise induced by the high concentration of laser light inside the cavity.

Bimorph deformable mirrors have been proposed as low cost adaptive mirrors. The two main operation parameters of a bimorph mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke should be maximised. However, conventional design means that there is a reciprocal relationship between these two parameters, and one parameter can only be improved at the expense of the other. Therefore, to date, designers have always looked for ways to improve either the resonant frequency or the stroke independently from each other.

Conventionally, a deformable mirror is supported rigidly around its edge, for example an annular ring overlapping the periphery of the mirror is used to hold the mirror firmly in position. Such an arrangement benefits from being simple yet rugged. However, it has an inherent disadvantage in that it creates a dead space around the mirror's edge. This corresponds both to the area of the mirror held firmly under the annular ring and also to the adjacent area. This is because the useable area of the deformable mirror (the active area) must bend to adopt a desired profile, for example either a concave or a convex shape. The annular area between the active area and the annular ring must bend in the opposite sense and so forms an area of inflexion that has undesirable optical properties. Hence the active area occupies only a central portion of the whole mirror.

One way of alleviating this problem is to clamp the mirror at only three positions, such that the mirror edge can twist. However, this arrangement is to the detriment of ruggedness and the twisting introduces unwanted distortions leading to an optically inferior performance.

It also is known e.g. from our earlier specification EP1576403A to support a deformable mirror by means of a series of radially extending flexible beams around its edge. Whilst this arrangement can permit the edge of the mirror to rotate as if it were simply-supported, the suspension is stiff and non-compliant to other movements of the mirror's edge. The present invention at least in its preferred embodiments seeks to mitigate this disadvantage.

According to one aspect of the invention, there is provided a deformable mirror assembly comprising a deformable mirror, a support structure, a suspension supporting the mirror from the support structure, and means for deforming the mirror other than by forces applied through the suspension, such that the mirror moves towards and away from the support structure, characterised in that the suspension comprises at least one elongate element, least a portion of which extends transversely and preferably obliquely relative to the direction of said movement and accommodates said movement by bending.

The at least one element may extend between points on the mirror and on the support structure which are spaced apart laterally of said direction.

There may be a plurality of parallel said elements. The assembly may comprise a plurality of said elements obliquely inclined in one sense and a further plurality of said elements obliquely inclined in an opposite sense, so as to cross each other, the elements being joined together where they cross.

The at least one element may be of serpentine shape. Thus, compliance of the suspension in at least one direction is provided by deformation of the at least one serpentine element in a manner which varies the curvature of the serpentine element.

The deformation when produced by a tensile load may tend to straighten the at least one serpentine element.

The at least one serpentine element may have a longitudinal extent in said direction, the serpentine shape of the element extending transversely of said longitudinal extent such that a straight line extending between the ends of the element passes at least partially outside said shape.

The serpentine shape may be a herringbone or zig-zag shape.

Preferably the serpentine shape includes at least two oppositely-handed bends.

The at least one suspension element may be generally planar.

The at least one suspension element may extend generally radially from the mirror to the support structure, the said direction being generally radially of the mirror.

There may be suspension elements distributed around the periphery of the mirror.

The suspension elements may be elongate relative to their width.

The suspension elements may extend from a common ring.

The suspension elements may extend between an inner ring forming part of or fixed to the mirror and an outer ring forming part of or attached to the support structure.

The deformable mirror may be a bimorph or other self-deforming mirror.

The at least one suspension element may be configured to conduct electrical signals to deforming means forming part of the mirror.

The invention will now be described merely by way of example with reference to the accompanying drawings wherein.

Figure 1:
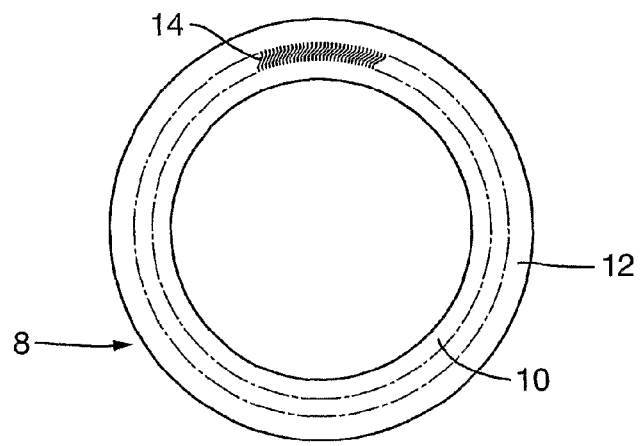
FIG. 1 shows diagrammatically a suspension according to the invention for a deformable bimorph mirror.
Figure 2A:
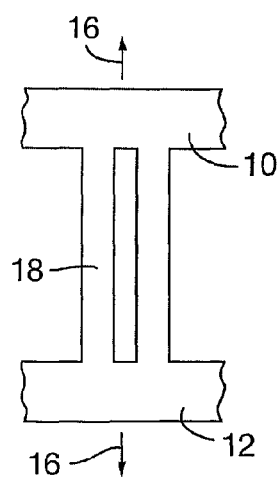
FIG. 2 shows part of the structure of FIG. 1, together with other structures not according to the invention for comparison purposes.
Figure 2B:
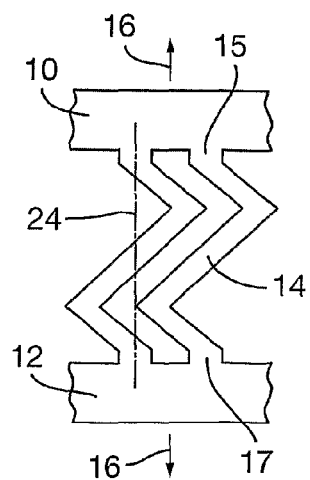

Referring to FIGS. 1 and 2b, a suspension 8 for a deformable bimorph mirror comprises an inner ring 10 adapted to be fixed to the periphery of a circular bimorph mirror, an outer ring 12 adapted to be fixed to support structure for the mirror and, extending between respective radially-aligned points 15, 16 on the two rings, a number of serpentine suspension elements 14 (FIG. 2b). The elements 14 are angularly spaced apart regularly around the annular gap between the rings 10, 12. In a prototype, the ring 10 is sized to accommodate a substrate of 18 mm diameter, and the suspension is etched or laser cut from 50 μm thick copper sheet.

As seen in FIG. 2b the suspension elements are of serpentine form; specifically in this case they are of herringbone or zig-zag shape. They could alternatively be of curved or sinuous serpentine form. The elements 14 are sufficiently serpentine so that relative radial movement of the rings 10, 12 due to deformation of the mirror, which tends to increase the size of the annular gap between them, is accommodated by the elements 14 bending so as to tend to straighten. This variation in the curvature of the serpentine elements presents only a relatively low stiffness (high compliance) to the tensile force applied to them and thus the edge of the mirror to which the ring 10 is attached is relatively free to move radially. The structure also has low stiffness against bending out of its plane, so that rotation of the edge of the bimorph mirror can be accommodated. The combination of bending flexibility in two directions permits the edge of the mirror also to move axially out of the plane of the suspension.

Figure 2C:
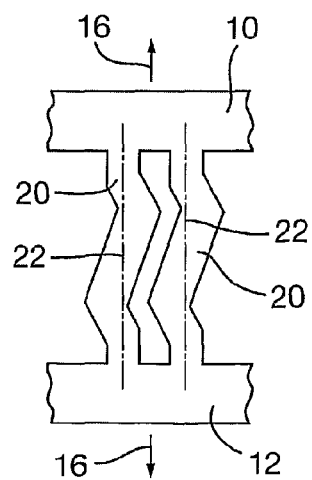

There are constraints on the minimum amount of serpentinity (serpentine-ness) of the elements 14 necessary in this form of suspension. FIG. 2a shows by way of contrast portions of rings 10, 12 which are joined by straight elements 18. Clearly these elements are stiff radially, and do not provide the compliance achieved by the serpentine elements 14. FIG. 2c shows elements 20 of slightly serpentine form. However they are insufficiently serpentine to provide the required compliance, because there is a continuous straight path 22 through the material of the elements normal to the rings 10, 12. The elements thus will resist the deformation 16 in tension as if they were straight as in FIG. 12a, rather than by substantially in-plane bending of the zig-zag portions.

Thus a requirement of this embodiment of a suspension according to the invention in that it must not be possible to draw a line through an element 14 between its ends and normally (radially) of the rings 10, 12 which passes continuously through the material of the element. A line 24 demonstrates that the embodiment of FIG. 2b meets this requirement.

Figure 3:
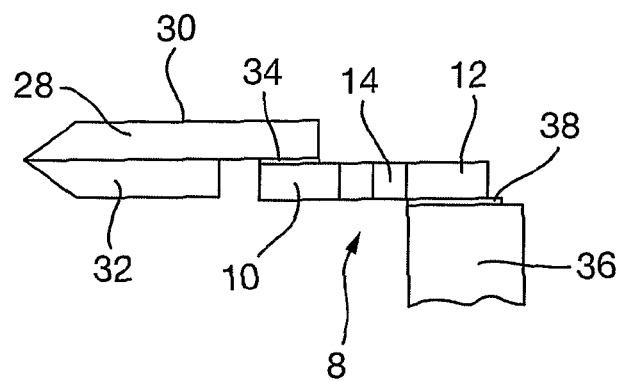
FIGS. 3 and 4 show a mirror assembly according to the invention.

FIG. 3 shows the suspension 8 installed as part of a self-deforming bimorph mirror assembly. The mirror consists of a circular passive substrate 28 having a mirror surface 30. On the reverse side of the substrate is mounted a piezo-electric (here PZT) layer 32 formed as a number of separate piezo-electric elements for locally applying bending forces to the substrate 28. The circumferential edge of the substrate 28 is glued at 34 to the ring 10 of the suspension 8. The ring 12 is glued at 38 to a fixed base structure 36. In this embodiment the suspension 8 is of copper, so as to provide a conductive path for dissipating heat generated in the substrate 28, for example by radiation incident on the mirror. Preferably therefore, the glue used to attach the suspension 8 to the substrate 28 and the base structure 36 is of a thermally-conductive type, for example EP30AN-1 by Master Bond Inc. Other materials which could be used for the suspension 8 are, for example, glass, silicon, Kapton® or other polyimide, silicon carbide or diamond, the latter two materials being produced for example by plasma enhanced chemical vapour deposition.

Figure 4:
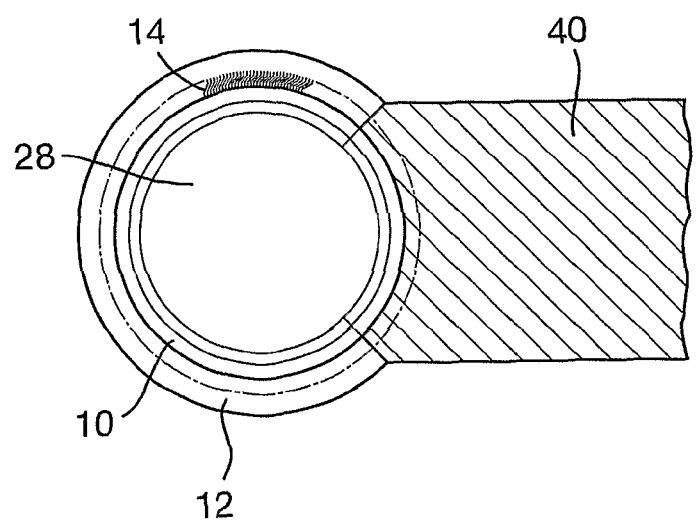

The piezo-electric elements are addressed via a flexible printed circuit 40, FIG. 4. A gap is provided in the suspension 8 to permit the flexible circuit to access the piezo-electric elements. The illustrated arrangement however results in the mirror substrate 28 being supported asymmetrically around its circumference, which may degrade its deformation performance. This disadvantage can be reduced if the flexible circuit is divided into several branches which access the piezo-electric elements via several gaps in the suspension 8 evenly distributed around its circumference. It will be appreciated that the mirror substrate 28 is deformed solely by the agency of the piezo-electric elements. The suspension 8 has a purely passive role, and is not used to transmit deforming forces to the mirror.

Figure 5:
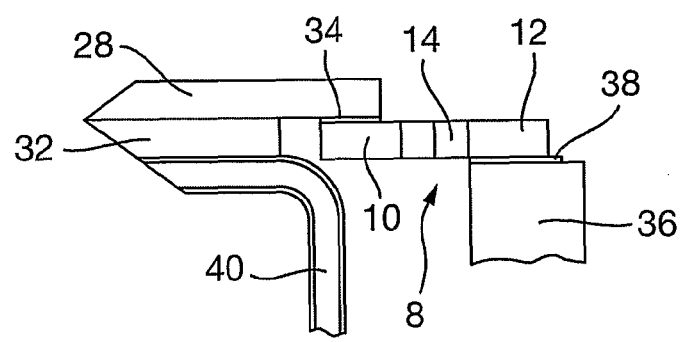
FIGS. 5 and 6 show modifications of the embodiment of FIGS. 3 and 4.

FIG. 5 shows an alternative arrangement in which the flexible circuit 40 is bent so as to access the piezo-electric elements without the need for gaps in the suspension 8.

Figure 6:
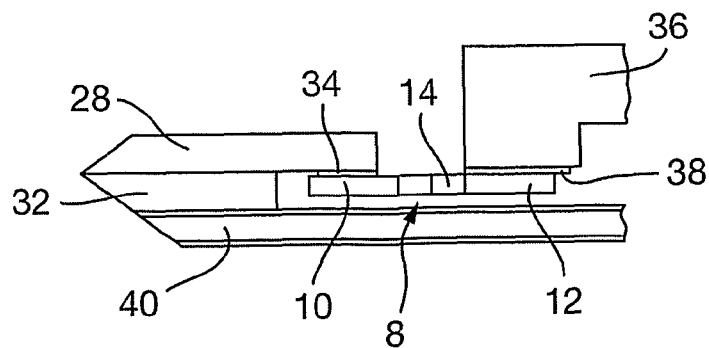

FIG. 6 shows a further variation in which the suspension 8 is mounted below the base structure 36 so that the flexible circuit 40 can be taken out radially from the piezo-electric elements. The generally planar arrangement of the mirror assembly then is preserved.

Figure 7:
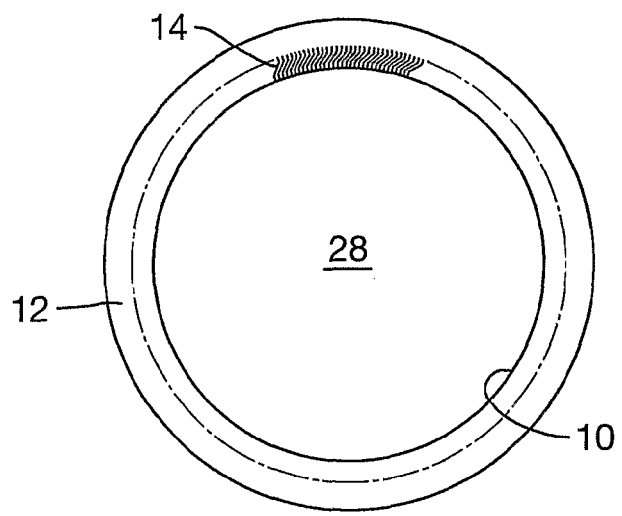
FIGS. 7 and 8 show a further embodiment of the invention.
Figure 8:
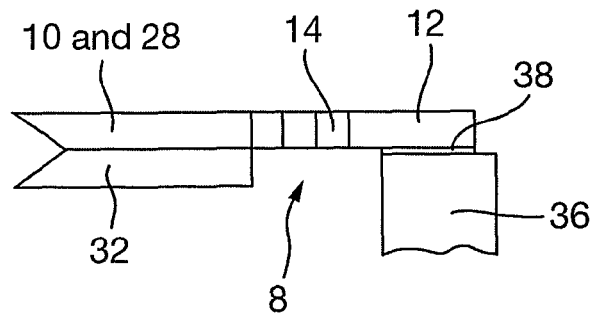

In another embodiment of the invention shown in FIGS. 7 and 8, the inner ring 10 of the suspension is formed directly as the outer part of the substrate 28 of the mirror. This avoids the need for the glued joint 34, and can improve the thermal conductivity of the mirror and suspension assembly. The ring 12 is bonded to the base structure 36 as already described. The substrate 28 can be of copper, or if high thermal loading is expected, it could be of silicon, silicon carbide or diamond. The substrate can be made as a lamination of two discs, one of which extends radially beyond the other and provides the support elements 14. The two laminated discs need not be of the same material, provided that the materials have very similar thermal expansion coefficients.

Although illustrated in FIG. 8 as a modification to the embodiment of FIGS. 3, 4 the suspension 8 may be integrated into the substrate 28 in the same way in the embodiments of FIGS. 5 and 6.

Figure 9:
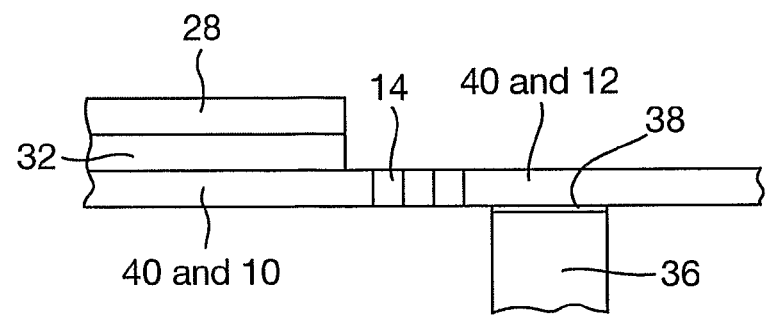
FIGS. 9 and 10 show another embodiment.
Figure 10:
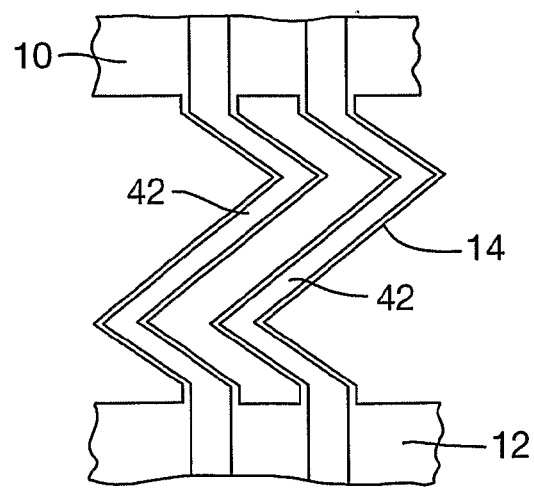

FIGS. 9 and 10 show another embodiment of the invention in which the suspension is integrated with the flexible circuit 40. The suspension elements 14 are made of the base material of the flexible circuit, for example polyimide or PEEK film. Conductive tracks 42 (FIG. 10) advantageously can be printed onto the suspension elements 14 to address the piezo-electric elements. Preferably and as already mentioned, the flexible circuit is divided and distributed so that the suspension elements are evenly spaced around the mirror.

Referring to FIG. 11, in another embodiment of the invention, straight supporting elements 44 extend obliquely between rings 10 and 12, instead of being normal to the rings as in FIG. 2a, and parallel to the applied deformation 16. The elements 44 thus extend between points 46 and 48 on the two rings which are spaced transversely (laterally) of each other with respect to the relative radial movement of the rings 10 and 12. The points 46, 48 are relatively offset sufficiently for there to be no continuous path radially between the rings through the material of the elements 44, as already discussed in the content of FIG. 2. Relative radial movement 16 of the rings thus is accommodated by bending of the elements 44, principally about their points of attachment to the rings 10, 12 with relatively low stiffness.

Figure 11A:
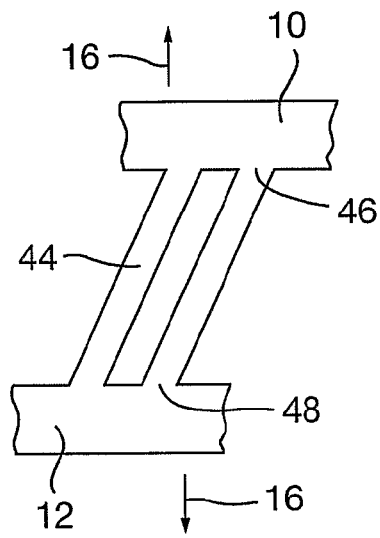
FIG. 11 shows yet further embodiments.
Figure 11B:
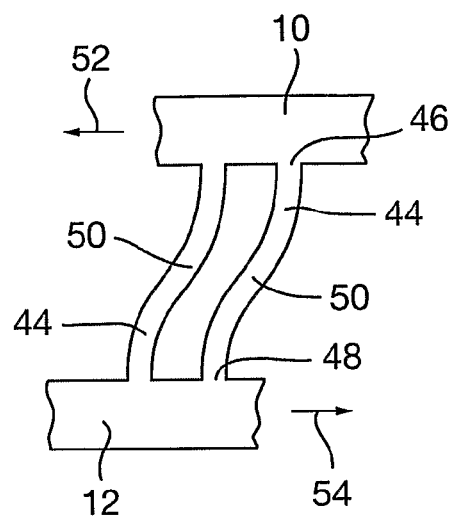

FIG. 11b shows a modification of the embodiment of FIG. 11a. The elements 44 follow a curved (in this example, serpentine) path between points 46, 48, at least the central section 50 of the elements extending obliquely between the rings. Movement 16 is again accommodated by bending of the elements 44, the deformation of the elements 44 being such that they tend to straighten.

Figure 11C:
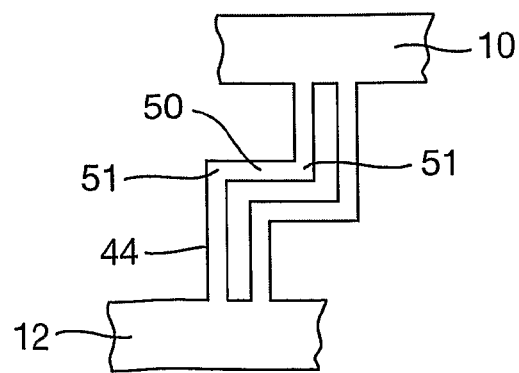

FIG. 11c shows a limiting case of the arrangement of FIG. 11b. The serpentine elements 44 have two 90° bends 51 so that the central section 50 extends fully transversely of the radial movement of the rings 10, 12. The necessary compliance is achieved by bending of the elements in the region of the right-angle bends 51. It will be appreciated that when arranged around the annular space between the rings 10, 12, the elements fall into groups each exhibiting a staircase pattern, the pattern repeating itself at intervals.

The embodiments of FIGS. 2b and 11 all have the advantage that the elements 14, 44 extend parallel to each other and thus can be provided in a close-packed array between the rings 10, 12. This can provide a substantial cross-sectional area of material for conducting heat from the mirror substrate to the structure 36.

The embodiment of FIG. 2b has the further advantage that the double-bend serpentine form of each element 14, plus it being attached to the rings 10, 12 at points 15, 17 which are radially aligned with each other, results in the structure being torsionally balanced when subjected to deformation in the direction 16. The embodiments of FIG. 11 are not so balanced; relative separating movement 16 of the rings 10, 12 will tend to result in relative rotation of the rings as shown by arrows 52, 54. Whilst the rotation may be second order in many circumstances, it may result in some reduction in the accuracy of control of the reflective performance of the mirror.

The appended abstract is repeated here as part of the specification. A passive suspension for a bimorph or other self-deforming mirror includes elements e.g. of herringbone shape extending between the edge of the mirror substrate and support structure. The elements have portions direction transversely (e.g. obliquely) relative to a direction of relative movement between the mirror edge and the support structure, so as to accommodate the movement by bending.

The invention claimed is:

1. A deformable mirror assembly comprising:
a deformable mirror,
a support structure,
a suspension supporting the mirror from the support structure, and
means for deforming the mirror other than by forces applied through the suspension, such that the mirror moves in a direction towards and away from the support structure,
wherein the suspension comprises a plurality of parallel elongate elements, wherein at least a portion of each element extends transversely and obliquely relative to the direction of the movement when the element is in a rest position and accommodates the movement by bending.

2. A mirror assembly as in claim 1, wherein each elongate element of the plurality is of serpentine shape.

3. A mirror assembly as in claim 2, wherein compliance of the suspension in at least one direction is provided by deformation of the serpentine-shaped elongate elements in a manner which varies a curvature of the serpentine-shaped elongate elements.

4. A mirror assembly as in claim 2, wherein the deformation when produced by a tensile load tends to straighten the serpentine-shaped elongate elements.

5. A mirror assembly as in claim 2, wherein each serpentine-shaped elongate element has a longitudinal extent in the direction of movement, the serpentine shape of each elongate element extending transversely to the longitudinal extent such that a straight line extending between ends of each element passes at least partially outside the shape.

6. A mirror assembly as in claim 2, wherein the serpentine shape is a herringbone or zig zag shape.

7. A mirror assembly as in claim 2, wherein the serpentine shape includes at least two oppositely handed bends.

8. A mirror assembly as in claim 2, wherein each elongate element extends generally radially from the mirror to the support structure, the direction of movement being generally radially to the mirror.

9. A mirror assembly as in claim 8, wherein the suspension comprises the plurality of parallel elongate elements distributed around a periphery of the mirror.

10. A mirror assembly as in claim 1, wherein each elongate element of the plurality is of serpentine shape, wherein compliance of the suspension in at least one direction is provided by deformation of the serpentine-shaped elongate elements in a manner which varies a curvature of the serpentine-shaped elongate elements, and wherein each elongate element of the plurality is elongate relative to its width.

11. A mirror assembly as in claim 1, wherein each elongate element of the plurality is generally planar.

12. A mirror assembly as in claim 1, wherein the suspension comprises the plurality of parallel elongate elements extending from a common ring.

13. A mirror assembly as in claim 12, wherein the parallel elongate elements extend between an inner ring forming part of or fixed to the mirror and an outer ring forming part of or attached to the support structure.

14. A mirror assembly as in claim 1, wherein the elongate elements of the plurality extend parallel to each other between an inner ring forming part of or fixed to the mirror and an outer ring forming part of or attached to the support structure so as to provide a closed-pack array between the inner ring and the outer ring that provides a substantial cross-sectional area of material for conducting heat from the mirror to the support structure.

15. A mirror assembly as in claim 1, wherein each parallel elongate element of the plurality extends between a first point on an inner ring forming part of or fixed to the mirror and a second point on an outer ring forming part of or attached to the support structure.

16. A mirror assembly as in claim 15, wherein the first point on the inner ring and the second point on the outer ring are radially-aligned.

17. A mirror assembly as in claim 15, wherein the first point on the inner ring and the second point on the outer ring are spaced transversely or laterally of each other with respect to the relative radial movement of the inner ring and the outer ring.

18. A mirror assembly as in claim 17, wherein the first point on the inner ring and the second point on the outer ring are relatively offset sufficiently such that there is no continuous path radially between the inner ring and the outer ring through the material of each parallel elongate element.

19. A deformable mirror assembly comprising:
a deformable mirror,
a support structure,
a suspension supporting the mirror from the support structure, and
means for deforming the mirror other than by forces applied through the suspension, such that the mirror moves in a direction towards and away from the support structure,
wherein the suspension comprises a plurality of parallel elongate elements, wherein at least a portion of each element extends transversely and obliquely relative to the direction of the movement when the element is in a rest position and accommodates the movement by bending, and
wherein the mirror is a self-deforming mirror.

20. A mirror assembly as in claim 19, wherein an elongate element of the plurality is configured to conduct electrical signals to the deforming means forming part of the mirror.

* * * * *